July 3, 1923.
F. G. WHITTINGTON
ANGLE GEAR HOUSING ADAPTER FOR FLEXIBLE SHAFTS
Filed April 3, 1922
1,460,524
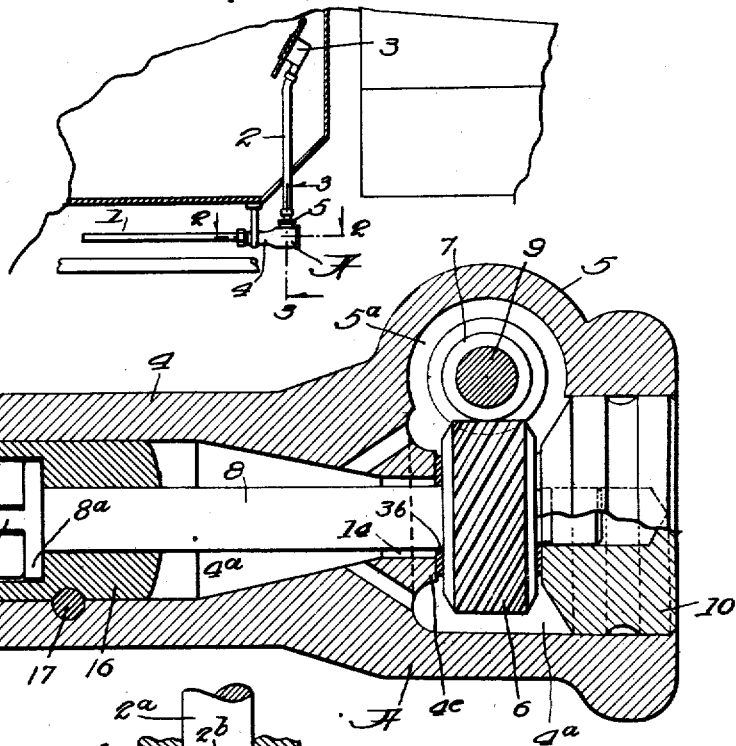
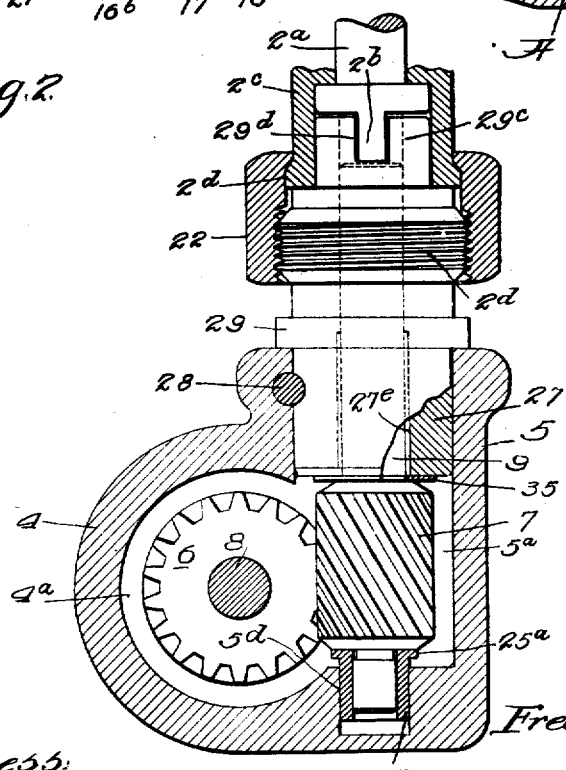
Inventor:
Frederick G. Whittington, Patented July 3, 1923.

1,460,524

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

ANGLE GEAR-HOUSING ADAPTER FOR FLEXIBLE SHAFTS.

Application filed April 3, 1922. Serial No. 549,194.

*To all whom it may concern:*

Be it known that I, FREDERIK G. WHITTINGTON, a citizen of the United States, residing in Evanston, in the county of Cook and the State of Illinois, have invented certain new and useful Improvements in Angle Gear-Housing Adapters for Flexible Shafts, of which the following is a specification, reference being had to the accompanying drawings, forming a part thereof.

The purpose of this invention is to provide an improved device for interposing in a flexible shaft connection at a point where the course of the shaft is at a comparatively abrupt angle, or for like service in any analogous situations. It consists in the elements and features of construction shown and described, as indicated in the claims.

In the drawings:—

Figure 1 is a diagrammatic view showing a device embodying this invention in a position where the service of such a device is required on an automobile, as, between the horizontal and substantial vertical portion of a flexible shaft which may connect the speedometer with the driving means (not shown).

Figure 2 is a section at the line, 2—2, on Figure 1 on an enlarged scale.

Figure 3 is a section at the line, 3—3, on Figure 1 on the same enlarged scale.

In the drawings, 1 and 2 may be understood as indicating two parts of a shaft which may be a flexible shaft for driving a speedometer or the like, indicated at 3. A being the angle adapter, embodying the present invention between the two shaft elements, 1 and 2. This angle adapter comprises, as shown, two arms, 4 and 5, at right angles to each other, both chambered for accommodating a shaft and gear thereon, the two gears, 6 and 7, intermeshing with each other, and as shown, being spiral gears being seen at Figures 2 and 3 in their intermeshing relation, said gears being rigid respectively, with the shafts, 8 and 9. The chambers, 4ª and 5ª, of the arms, 4 and 5, intersect laterally that is, one being offset laterally from the other, the two gears intermeshing at the intersection. The chamber, 4ª, is enlarged at the end outside the angle for admitting the gear, 6, onto its shaft, 8, and receiving a bushing, 10, following the gear which is designed to be driven tight into the otherwise open end of the chamber. This chamber is constricted or narrowed at the opposite side of the gear, 6, from said follower bushing, 10, as seen at 14, but not so to journal the shaft at that point; and beyond this constricted or narrowed portion it is enlarged taperingly for a distance and then cylindrically to the end of the arm, 4, for receiving at said end a steel bushing, 16, which is fitted thereinto and designed to be secured by a key, 17, at a fixed and definite position longitudinally of said arm. This bushing, 16, is itself counterbored at the outer end beyond the limited portion which affords a journal bearing for the shaft, to admit the enlarged flanged end of said shaft, 8, shown at 8ª, which flanged end beyond said flange, 8ª, has the coupling terminal, 8ᵇ, for engaging the reciprocal coupling terminal, 1ª, of the rotating element of the flexible shaft which is accommodated in the counterbore of the bushing, 16; and this bushing, 16, has its outer end enlarged in diameter as seen at 16ᵇ, for engaging the coupling nut, 21, which, it will be understood, is passed over the bushing before the latter is inserted in the casing arm, 4, and is interiorly threaded for screwing onto the terminal, 1ᵇ, of the flexible shaft casing shown at 1ᶜ. The other arm, 5, of the angle housing, preferably does not have its chamber extending through and through,—that is, opening at both ends,—but only at the end away from the angle; and at the other end the chamber is reduced in diameter as seen at 5ᵈ, for receiving a journal bearing bushing, 25, which is preferably flanged at the end as seen at 25ª, for extending the area at which it abuts against the gear, 7, for stopping endwise said gear and its shaft in the housing. The open end of the chamber, 5ª, of the arm, 5, has fitting into it a journal bearing bushing, 27, which is definitely positioned therein by a key, 28, and also by the flange, 29, which stops against the outer end of the housing arm. This bushing constitutes the female member of the coupling for connecting the flexible shaft member which extends from the arm, 5, and for this purpose and for coupling to the flexible shaft casing, it has an enlarged and threaded portion between the flange, 29, and the outer end of said bushing, and the outer end portion is reduced in diameter at 29ᶜ, and at the end has the transverse slot, 29ᵈ, for receiving the transverse coupling terminal, 2ᵇ, of the rotating element, 2ᵃ, of the flexible shaft whose casing has a terminal, 2ᶜ, enlarged at the end as shown at 2ᵈ, for engagement by the coupling nut, 22, screwed onto the threaded enlargement, 2ᵈ, for coupling the flexible shaft as to its rotating member to the shaft, 9, and as to its casing to the journal bushing, 27.

The details of construction described are designed particularly in view of making the housing, A, a soft metal die casting, and providing all the wearing parts, whether for journaling or receiving thrust, of hard metal journal bearing or wearing plates, and for this purpose all the journal bearings mentioned are designed to be of steel fitted, and in the instances so described, making a drive fit in the seats provided therefor in the soft metal die casting. To reduce the wearing and friction area of the shaft, 9, in the journal bushing, 27. Said bushing is counter-bored from the inner end for a considerable distance, as seen at 27ᵉ; and to afford an end stop and wearing plate for the gear, 7, against the inner end of the bushing, there is provided a steel washer, 35, whose inner diameter substantially fits the shaft, and whose outer diameter is spaced to afford an adequate lap on the end of the bushing.

The parts are assembled in the arm, 4, by first passing the journal bushing, 16, onto the shaft, 8, its smaller end up against the flange, 8ᵃ, then inserting said shaft with the said bushing thereon into the end of the arm, 4, remote from the angle, passing the shaft through the constriction as shown at 14, and passing onto it the wearing washer, 36, whose diameter affords an adequate bearing area against the shoulder of the housing formed at the end of said constricted portion at 4ᵉ. The gear, 6, is then forced onto the shaft, making a drive fit thereon, and followed by the journal bearing bushing, 10, which is forced into the otherwise open end of the chamber, leaving the gear, 6, only sufficient freedom for rotation without substantial end play. In the other arm of the housing the order of assembly is the insertion of the journal bearing bushing, 25, which is driven into its seat in the housing, but not to the limit. The shaft, 9, with the gear, 7, rigidly mounted on it (and it may be integral with it) is next inserted and by the gear the journal bushing, 25, is forced into its seat to a point at which the gears are properly intermeshed; and the gear, 7, is then followed by the wearing plate, 35, and the journal bushing, 27 the latter being secured by the key, 28, it being understood that suitable gauges have been employed to predetermine the driving in of the journal bushing, 4ᵇ, only to the proper extent to leave the gear, 7, without substantial end play but free for rotation between the flanged end, 25ᵃ, of the bushing, 25, and the wearing plate, 35, whose relation is determined definitely by the keyed-in position of the bushing, 27.

When thus assembled it will be seen that all the surfaces exposed to wear of rotation or thrust of hard metal, and that there is no movement or thrust causing wear which is borne by the soft metal of the housing.

I claim:—

1. An angle-formed gear housing for interposing in a flexible shaft connection and the like, comprising an integral casing having its arms at an angle to each other, both axially chambered, said chambers intersecting and merging at the angle, one of said arms having a chamber extending throughout its full length and enlarged at the end outside the angle for admitting a gear onto the shaft therein, and being restricted in diameter at the further side of the intersection to form a shoulder for stopping said gear without journaling the shaft adjacent to the gear, said chamber being enlarged taperingly from said restriction toward the end of the arm, and provided with a journal bushing for the shaft in the end.

2. An angle-formed gear housing for interposing in a flexible shaft connection and the like, comprising an integral casing having its arms at an angle to each other, both axially chambered, said chambers intersecting for opening into each other for accommodating the intermeshing of the gears, shafts journaled in said arms respectively, carrying intermeshing gears; bushings in said arms respectively in which the respective shafts are journaled at their ends, the intermeshing gears being carried on their shafts between the ends thereof, one of said arms having its chamber restricted in diameter adjacent to the gear which is carried by the shaft in said arm, for stopping the gear and shaft endwise, the housing being provided with apertures by-passing said constriction to afford communication for lubricant between the two chambers.

In testimony whereof, I have hereunto set my hand at Chicago, Illinois, this 30th day of March, 1922.

FREDERIK G. WHITTINGTON.